United States Patent [19]
Whitehead

[11] Patent Number: 5,362,922
[45] Date of Patent: Nov. 8, 1994

[54] ELECTRICAL FLOOR BOX DIVIDER

[75] Inventor: James H. Whitehead, Collierville, Tenn.

[73] Assignee: Thomas & Betts Corporation, Memphis, Tenn.

[21] Appl. No.: 954,650

[22] Filed: Sep. 30, 1992

[51] Int. Cl.[5] .............................................. H02G 3/12
[52] U.S. Cl. .................................................... 174/48
[58] Field of Search .................. 174/48, 49; 52/220.1, 52/220.7; 220/3.8

[56] References Cited

U.S. PATENT DOCUMENTS

| | | | |
|---|---|---|---|
| 2,596,236 | 5/1952 | Glosier | 220/3.8 |
| 3,061,663 | 10/1962 | Reiland | 174/49 |
| 3,453,791 | 7/1969 | Fork | 52/220.7 |
| 3,471,629 | 10/1969 | O'Leary | 174/49 |
| 4,295,575 | 10/1981 | Flachbarth | 220/3.8 X |
| 4,591,656 | 5/1986 | Mohr | 174/48 |
| 4,661,652 | 4/1987 | Benscoter | 174/48 |
| 4,745,717 | 5/1988 | Domigan | 174/48 X |
| 5,010,211 | 4/1991 | Bartee | 174/48 |
| 5,179,252 | 1/1993 | Yang | 174/48 |
| 5,180,074 | 1/1993 | Bowman et al. | 220/3.8 |
| 5,184,438 | 2/1993 | Takeda et al. | 174/48 X |

OTHER PUBLICATIONS

American Electric Catalog, Steel City ® "Floor Box Service Fittings Poke-Thru", 32 pages (including front and back covers).
Walker Catalog, Walkerbox ® Resource RFB TM Recessed Floor Box, Cat. No. RFB 1090, 6 pages, 1991.

Primary Examiner—Leo P. Picard
Assistant Examiner—David Tone
Attorney, Agent, or Firm—Robert M. Rodrick

[57] ABSTRACT

A plastic divider for providing a tunnel in the bottom portion of an electrical floor box having a box central portion with box cells extending outwardly therefrom. The divider is positioned in the box central portion and has sidewall frangible sections that are selectively removable to connect one or more cells with the space in the central portion of the box beneath the divider. The space in the central portion of the box beneath the divider is closed off from adjacent cells by sidewalls that have their frangible sections intact. A separate partition member is selectively attachable to the side of the divider having the sidewalls thereon for modifying the manner in which the cells communicate with one another and with the space beneath the divider.

19 Claims, 3 Drawing Sheets

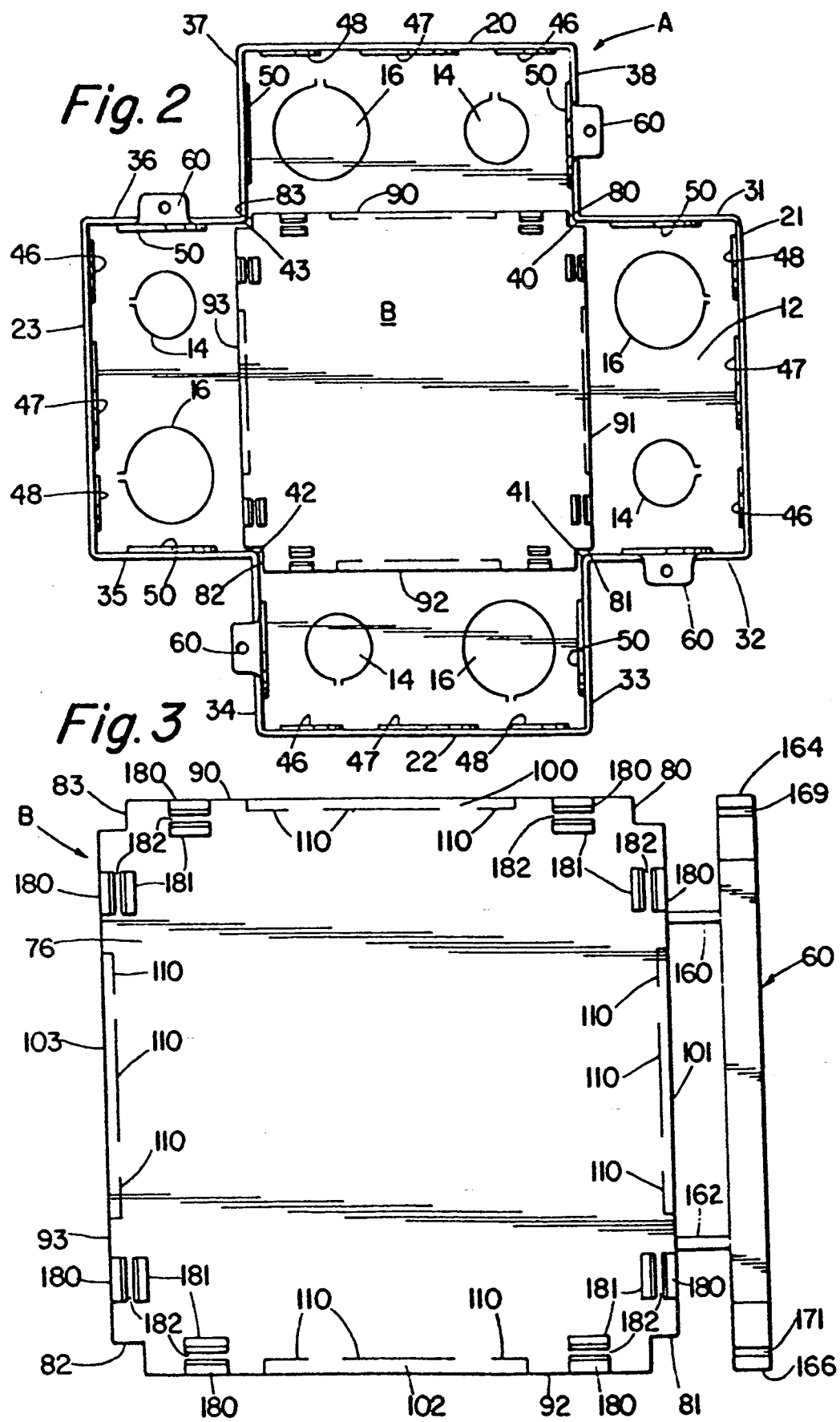

ELECTRICAL FLOOR BOX DIVIDER

FIELD OF THE INVENTION

This invention relates to the art of dividers for electrical junction boxes and, more particularly, to such dividers for selectively separating or connecting cells in such boxes. The invention is particularly applicable to electrical floor boxes having the general shape of a Greek cross and will be described with specific reference thereto. However, it will be appreciated that the invention has broader aspects and can be used in other boxes and environments.

BACKGROUND OF THE INVENTION

In an electrical floor box having the general shape of a Greek cross, the individual arms of the cross define box cells located around the sides of a square central box area. Wires that extend through the box may be used for power, telecommunications and electronic circuitry, and it is desirable to maintain separation of wires that are used for different purposes. For example, telecommunications wires may pass through only one cell from one end thereof to the other. It is desirable to provide a barrier closing off the cell portion containing these telecommunication wires from the square central portion of the box through which power wires may extend. In other cases, wires may extend 90° through the box from one cell to an adjacent cell by passing through the square central portion and it is also desirable to maintain separation of these wires from wires passing through other cells.

It would be desirable to have a divider that could be modified for selectively blocking or establishing communication between individual cells and the square central portion of the box.

SUMMARY OF THE INVENTION

An electrical floor box of the type described in the general shape of a Greek cross is provided with a substantially square plastic divider receivable in the square central portion of the box. The divider comprises a substantially square and flat plate having top and bottom surfaces and four sides. A sidewall extends along each side of the plate on the bottom surface thereof. Each sidewall includes a frangible section that is selectively removable for establishing communication between the square central portion of the box and an adjacent cell.

Diagonal walls extend across the corners of the divider between adjacent sidewalls. The diagonal walls are preferably smoothly curved inwardly toward the center of the divider. The diagonal walls have central slots therein for receiving end portions of a partition member that may be extended diagonally across the divider or may extend from one diagonal wall to an adjacent diagonal wall.

The top surface of the divider is provided with pairs of spaced projections adjacent the sides thereof to define grooves extending parallel to the sides for receiving the lower end portion of a device cover plate that closes off a cell above the divider.

The divider has notched corners for receiving box corners formed by the intersections between adjacent cell endwalls at the square central portion of the box.

It is a principal object of the present invention to provide an improved plastic divider for use in electrical junction boxes.

It is also an object of the invention to provide such a divider that can be selectively modified by selective removal of frangible sidewall sections or by the selective use of a partition member.

It is a further object of the invention to provide such a divider that is economical to manufacture and easy to install.

BRIEF DESCRIPTION OF THE DRAWING:

FIG. 2 is a top plan view of an electrical floor box having the general shape of a Greek cross and with the divider of the present application positioned in the bottom thereof;

FIG. 3 is a top plan view of a plastic divider constructed in accordance with the present application;

DESCRIPTION OF THE PREFERRED EMBODIMENT

Figure 1:
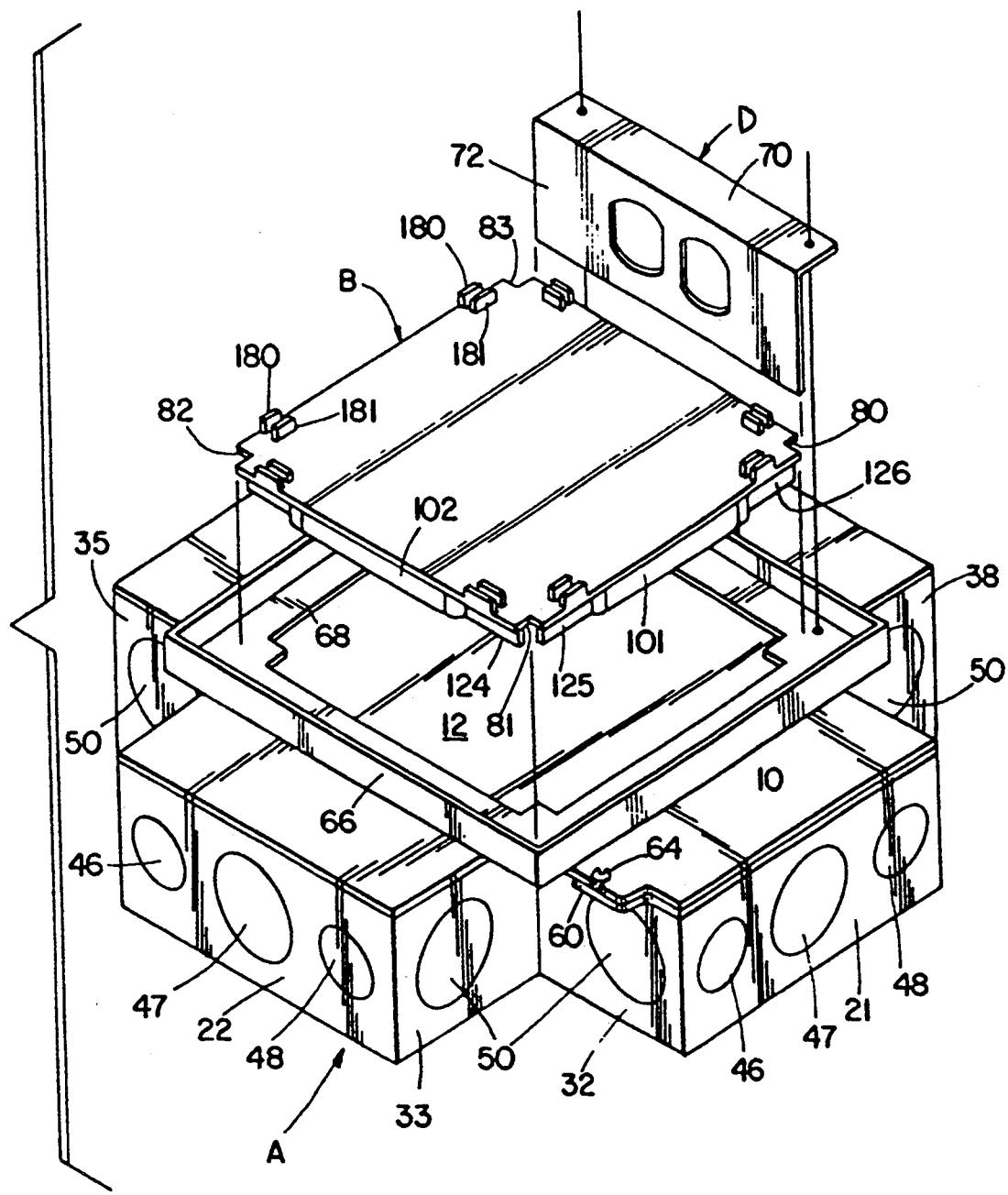
FIG. 1 is a perspective illustration of a floor box assembly showing the general environment in which the divider of the present application is used.

Referring now to the drawing, wherein the showings are for purposes of illustrating a preferred embodiment of the invention only and not for purposes of limiting same, FIGS. 1 and 2 show an electrical floor box A in the general shape of a Greek cross. The box has a substantially square interior central portion and the arms of the cross define cells extending outwardly from each side of the central portion. A top plate 10 closes the open top of each cell while leaving the square central portion of the box open. Box A has a bottom wall 12 that is also in the general shape of a Greek cross, and each arm of the cross has knockouts 14,16 within each box cell.

Box A has sidewalls 20-23 which also define the outer walls for the four box cells. These cells have endwalls 31-38, and adjacent endwalls intersect one another at right angles at inner box corners 40-43 adjacent the corners of the box square central portion.

Box sidewalls 20-23 have knockouts 46-48 therein, and cell endwalls 31-38 have knockouts 50 therein. Laterally extending ears 60 on cell endwalls 32, 34, 36 and 38 have tapped holes therein for receiving screws used to attach a top plate to the box.

FIG. 1 shows a top plate 10 attached to box A by screws 64 extending through suitable holes or slots therein and into the tapped holes in box ears 60. Top plate 10 has a portion closing the open top of each cell while leaving the square central portion of the box completely open. A square frame 66 extends upwardly from top plate 10 and is spaced outwardly from the generally square inner periphery 68 thereof.

A substantially square plastic divider B is dimensioned to fit through the inner periphery 68 of top plate 10 for resting on bottom 12 of box A. A device cover plate D has a horizontal portion 70 attachable to a portion of top plate 10 inside of frame 66, with vertical portion 72 thereof extending downwardly into engagement with divider B for closing off a cell above divider B. The type of cover plate shown is for a power outlet, and different types of such plates are provided depending upon whether a cell is activated with power, telecommunications or electronic circuitry. The bottom end portion of vertical portion 72 of device cover plate D extends into grooves provided adjacent the sides of divider B.

Figure 4:
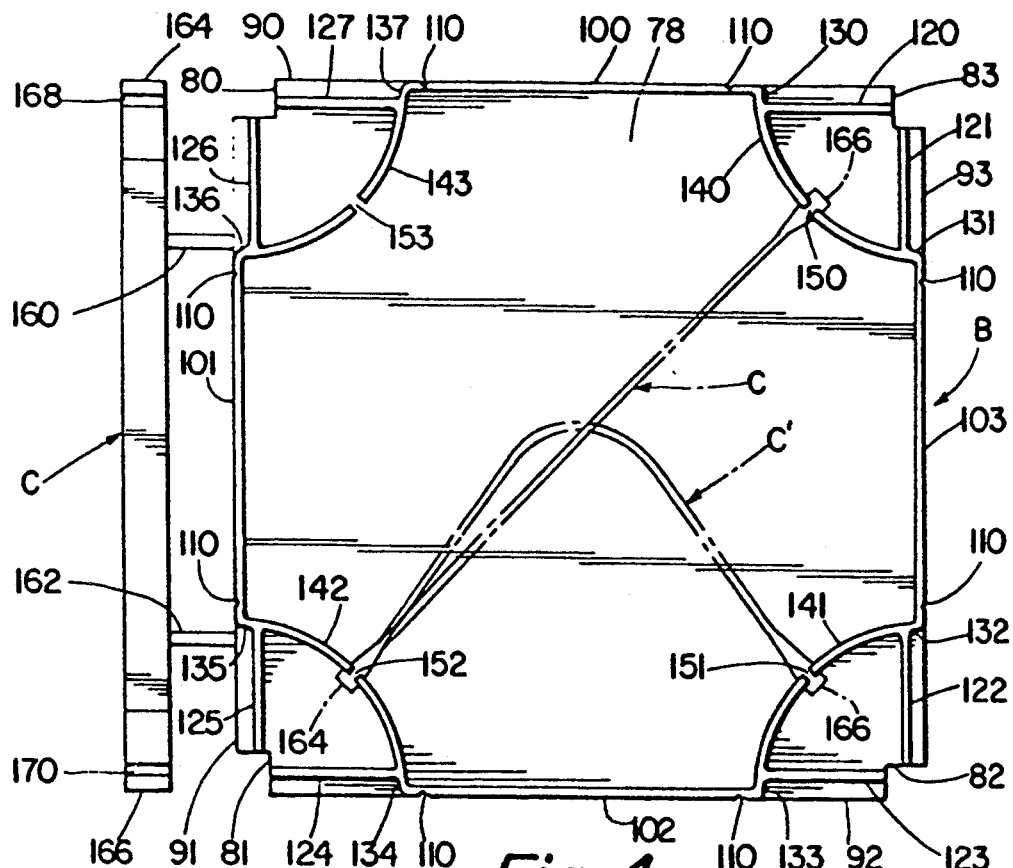
FIG. 4 is a bottom plan view of the plastic divider of the present application.
Figure 5:
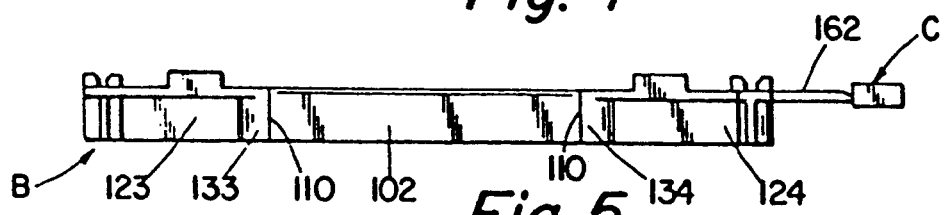
FIG. 5 is a side elevational view of the divider of FIG. 3.
Figure 6:
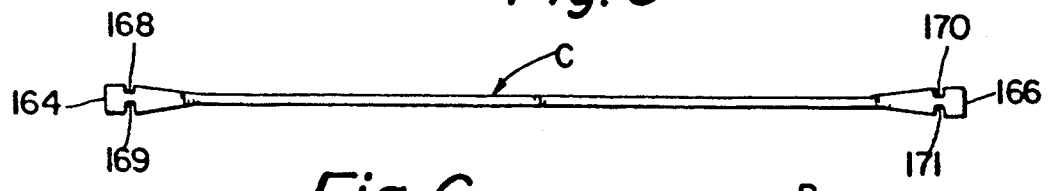
FIG. 6 is a side elevational view of a partition member used with the divider of FIGS. 3-5.

FIGS. 3-5 shows substantially square plastic divider B in the form of a substantially flat plate having substantially planar top and bottom surfaces 76, 78. The corners of divider B are notched as indicated at 80-83 for receiving inner corners 40-43 of box A when divider B is inserted therein as shown in FIG. 2.

The outer periphery of divider B is defined by four substantially straight sides 90-93, and a sidewall extends downwardly from bottom surface 78 adjacent each divider side 90-93. The four sides combined define an outer periphery of the divider, and the four sidewalls combined define a divider peripheral wall extending substantially perpendicular to bottom surface 78 adjacent the outer periphery thereof.

Figure 7:
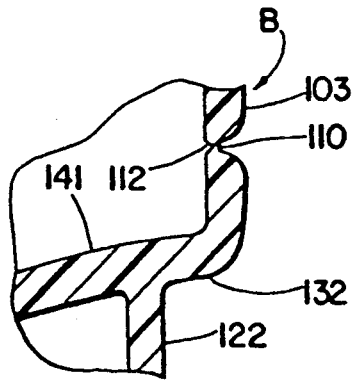
FIG. 7 is an enlarged fragmentary cross-sectional view showing a portion of the frangible periphery of a frangible section of a divider sidewall.

Each sidewall includes a frangible section 100-103 that is selectively removable therefrom for providing a passage therethrough. Each frangible section 100-103 has a substantially weakened periphery represented by the lines indicated at 110 in FIGS. 3 and 5. As shown in FIG. 7, the weakened periphery 110 is defined by a deep groove in the plastic material on one side thereof and being opposed by a shallower generally V-shaped groove 112 on the opposite side thereof. The thin plastic material remaining between the two grooves is readily broken to remove a frangible section 100-103.

Each frangible section 100-103 is substantially centrally located in its sidewall and has a length that is substantially greater than ⅓ the length of the entire sidewall. The length of each frangible section is preferably somewhat less than one-half the total length of a sidewall. Each sidewall includes a pair of offset sidewall portions that are offset inwardly from a side 90-93 of divider B and from adjacent frangible sections 100-103. These offset sidewall portions are generally indicated by numerals 120-127, and are integrally connected with the sidewall portions having frangible sections 100-103 therein by inclined sidewall portions 130-137.

Diagonal walls 140-143 extend across adjacent sidewalls inwardly from the notched corners of divider B. Diagonal walls 140-143 intersect the sidewalls closely adjacent inclined sidewall portions 130-137. Diagonal walls 140-143 are smoothly curved inwardly away from the divider notched corners and toward the center of the divider. The curvature facilitates pulling wires through the box when the wires make a 90° turn through the central portion of the box from one cell to an adjacent cell.

Each diagonal wall has a central slot 150-153 therein for connecting a partition member thereto. A partition member C is molded integrally with divider B and connected therewith by frangible runners 160, 162. Partition member C has a width that is approximately the same as the height of each sidewall on the bottom surface of divider B and a thickness that allows bending of partition member C without fracturing. Opposite end portions 164, 166 of partition member C have grooves 168, 169 and 170, 171 therein for receiving the terminal end portions of diagonal walls 140-143 adjacent slots 150-153.

FIG. 4 shows partition member C connected with diagonally opposite diagonal walls 140, 142. An alternative position is indicated at C' connected between adjacent diagonal walls 141, 142. It will be recognized that the partition member can be connected between any two adjacent diagonal walls or diagonally across partition member B between diagonally opposite diagonal walls.

The depth of box A is substantially greater than the height of divider B. By way of example, box A may have a depth of 2½ or 3 inches, while the height of divider B is only ½ inch. When divider B is positioned within a box A, the terminal ends of the sidewalls and the diagonal walls rest on the bottom of the box. Thus, divider B forms a hollow space therebeneath in the square central portion of box A. This hollow space is separated from adjacent cells by the sidewalls on divider B.

Frangible sidewall sections 100, 102 may be removed and power wires may be extended through the hollow space beneath divider B by removing one or more of knockouts 46-48 in box sidewalls 20, 22. With power wires so extended through the central portion of the box beneath divider B, such wires will be separated from the opposite side box cells by the other divider sidewalls. Telecommunications and electronic circuitry wires may then be extended through the other cells by removing the knockouts 50 from cell endwalls 31, 32 and 35, 36.

Partition member C is attachable diagonally across divider B when it is desired to extend wires from one cell to an adjacent cell. If a frangible wall has been removed, such as frangible portion 102 in FIG. 4, it is possible to again completely close off the cell along that particular sidewall by attaching a partition member as shown in position C' in FIG. 4.

As best shown in FIG. 3, the top surface of divider B adjacent each side thereof is provided with two pair of inner and outer spaced-apart projections 180, 181 thereon. The projections are located adjacent each corner of divider B and define grooves 182 therebetween extending parallel to divider sides 90-93 in inwardly-spaced relationship to such sides. The lower end portion of vertical wall 72 on device cover plate D is receivable in the grooves with the terminal end of wall 72 on or closely adjacent to the top surface of divider B.

Offset wall portions 120-127 are in-line with grooves 182 defined between projections 180, 181 on the top surface of divider B. Offset wall portions 120-127 are receivable in grooves 182 to allow stacking of a plurality of dividers B if so desired. Obviously, the depth of a box would have to be larger in order to enable stacking of dividers. This would provide additional flexibility by having a central space beneath a first divider in the bottom of the box and another central space between the two dividers. Each central space could be selectively opened to communicate with an adjacent cell by removing frangible sections of the sidewalls.

The space beneath divider B within box A is selectively blocked from adjacent cells by the divider sidewalls or by use of the partition member. Selective removal of frangible sections from the sidewalls opens the central space in the box beneath the divider for communication with selected cells. Use of partition member C provides more flexibility in how the central space is opened or closed to adjacent cells.

Although the invention has been shown and described with respect to a preferred embodiment, it should be appreciated that equivalent alterations and modifications will occur to others skilled in the art upon the reading and understanding of this specification. The present invention includes all such equivalent alterations and modifications, and is limited only by the scope of the claims.

I claim:

1. A divider for providing a tunnel in the bottom portion of an electrical floor box, said divider comprising a substantially flat plate having top and bottom surfaces, angled, notched corners and an outer periphery, a peripheral wall extending outwardly from said bottom surface adjacent said outer periphery and being discontinued at said notched corners, and said peripheral wall including a plurality of selectively removable frangible wall sections.

2. The divider of claim 1 wherein said plate is substantially square and having substantially right-angled notched corners, said peripheral wall being discontinued at said substantially right-angled notched corners.

3. The divider of claim 1 wherein said plate is square and said peripheral wall comprises a sidewall on each side of the square, and diagonal walls extending diagonally across corner portions of said plate on said bottom surface thereof between adjacent ones of said sidewalls.

4. The divider of claim 1 wherein said plate is square and said peripheral wall includes a sidewall extending along each side of the square, each said sidewall having one of said frangible sections centrally located therein.

5. The divider of claim 4 wherein each said frangible section has a length that is substantially greater than one-third of the length of each side of the square.

6. A divider for providing a tunnel in the bottom portion of an electrical floor box, said divider comprising a substantially flat plate having top and bottom surfaces and an outer periphery, a peripheral wall extending outwardly from said bottom surface adjacent said outer periphery, and said peripheral wall including a plurality of selectively removable frangible wall sections, said plate being square and said peripheral wall comprising a sidewall on each side of the square, and diagonal walls extending diagonally across corner portions of said plate on said bottom surface thereof between adjacent ones of said sidewalls, said diagonal walls being curved in a direction toward the center of said plate.

7. The divider of claim 6 wherein each of said diagonal walls is interrupted intermediate its opposite ends to define a slot extending substantially perpendicular to said plate.

8. The divider of claim 7 including a partition receivable in said slots, said partition including opposite end portions having means thereon for retaining said opposite ends in said slots, and said partition having a length sufficient to span across diagonally opposite ones of said diagonal walls.

9. The divider of claim 8 wherein said end portions comprise grooves receiving terminal end portions of said diagonal walls adjacent said slots.

10. A divider for providing a tunnel in the bottom portion of an electrical floor box, said divider comprising a substantially flat plate having top and bottom surfaces an outer periphery, a peripheral wall extending outwardly from said bottom surface adjacent said outer periphery, and said peripheral wall including a plurality of selectively removable frangible wall sections, said plate being square and said peripheral wall comprising a sidewall on each side of the square, and diagonal walls extending diagonally across corner portions of said plate on said bottom surface thereof between adjacent ones of said sidewalls, said divider further including connecting means for connecting a partition member to said diagonal walls.

11. The divider of claim 10 including a partition member having a length sufficient to span diagonally opposite ones of said diagonal walls.

12. The divider of claim 11 wherein said connecting means comprises slots in said diagonal walls and grooves in said partition member.

13. A divider for providing a tunnel in the bottom portion of an electrical floor box, said divider comprising a substantially flat plate having top and bottom surfaces and an outer periphery, a peripheral wall extending outwardly from said bottom surface adjacent said outer periphery, and said peripheral wall including a plurality of selectively removable frangible wall sections, said plate being square and said peripheral wall including a sidewall extending along each side of the square, each said sidewall having one of said frangible sections centrally located therein, each said sidewall including offset sidewall portions on opposite sides of said frangible sections, said offset sidewall portions being offset inwardly from said outer periphery and from said frangible sections.

14. A divider for providing a tunnel in the bottom portion of an electrical floor box, said divider comprising a substantially flat plate having top and bottom surfaces and an outer periphery, a peripheral wall extending outwardly from said bottom surface adjacent said outer periphery, and said peripheral wall including a plurality of selectively removable frangible wall sections, said plate being substantially square and including attaching means on said top surface adjacent said outer periphery along each side of the square for attaching a device cover plate thereto.

15. The divider of claim 14 wherein said attaching means comprises projections extending outwardly from said top surface and having grooves therein extending parallel to a side of the square.

16. The divider of claim 15 wherein said peripheral wall includes a sidewall extending along each side of the square, each said sidewall having offset sidewall portions aligned with said grooves on the opposite side of said plate therefrom.

17. A plastic divider for providing a tunnel in a bottom portion of an electrical floor box, said divider including a substantially flat plate member having a substantially square peripheral shape defined by four straight sides, said plate having top and bottom surfaces, a sidewall extending along each said side on said bottom surface thereof, each side sidewall including a selectively removable frangible section, and diagonal walls extending diagonally across said bottom surface between adjacent sidewalls inwardly of the corners of said plate, said diagonal walls being curved toward the center of said plate.

18. A plastic divider for providing a tunnel in a bottom portion of an electrical floor box, said divider including a substantially flat plate member having a substantially square peripheral shape defined by four straight sides, said plate having top and bottom surfaces, a sidewall extending along each said side on said bottom surface thereof, each said sidewall including a selectively removable frangible section, and diagonal walls extending diagonally across said bottom surface between adjacent sidewalls inwardly of the corners of said plate, said plate having notched corners.

19. An electrical floor box having a bottom and a square central portion, a cell extending outwardly on each side of said square central portion, said box having a peripheral wall that includes four 90° internal box corners at the intersections of the central square portion with the adjacent ends of adjacent cells, a square plastic divider positioned in said square central portion of said box and having notched corners receiving said internal box corners, said divider having sidewall extending downwardly therefrom and resting on said box bottom, said sidewall selectively separating said cells from a space defined between said box bottom and said divider in said square central portion of said box, and said sidewalls including selectively removable frangible sections for selectively establishing communication between said space and a cell.

* * * * *